(12) United States Patent
Mendes et al.

(10) Patent No.: US 12,553,728 B2
(45) Date of Patent: Feb. 17, 2026

(54) VEHICLE EFFICIENCY PREDICTION AND CONTROL

(71) Applicant: Meight Technologies, S.A., Évora (PT)

(72) Inventors: Luis Gonçalves Mendes, Charneca da Caparica (PT); António Luís Mendes Caldeira Fradique, Lisbon (PT); António João Ferreira Reis, Amadora (PT)

(73) Assignee: Meight Technologies, S.A., Évora (PT)

( * ) Notice: Subject to any disclaimer, the term of this patent is extended or adjusted under 35 U.S.C. 154(b) by 278 days.

(21) Appl. No.: 16/835,410

(22) Filed: Mar. 31, 2020

(65) Prior Publication Data

US 2021/0302183 A1    Sep. 30, 2021

(51) Int. Cl.
*G01C 21/34*    (2006.01)
*G01C 21/36*    (2006.01)

(52) U.S. Cl.
CPC ..... *G01C 21/3469* (2013.01); *G01C 21/3626* (2013.01); *G01C 21/3697* (2013.01)

(58) Field of Classification Search
CPC ............ G01C 21/3469; G01C 21/3697; G01C 21/3626
See application file for complete search history.

(56) References Cited

U.S. PATENT DOCUMENTS

2002/0056314 A1* 5/2002 Kumagai ............ G07C 5/0858
73/114.55
2005/0027423 A1* 2/2005 Minami ................. G01F 9/023
701/51
2007/0203625 A1* 8/2007 Quigley ............. F02D 41/1406
701/103

(Continued)

FOREIGN PATENT DOCUMENTS

EP          2258588 B1    12/2010
WO    WO-2019034233 A1 *  2/2019

OTHER PUBLICATIONS

Lind S. Powertrain modeling for realtime simulation [Internet] [Dissertation]. 2014. Available from: https://urn.kb.se/resolve?urn=urn:nbn:se:liu:diva-112126 (Year: 2014).*

(Continued)

*Primary Examiner* — Faris S Almatrahi
*Assistant Examiner* — Selena M Jin
(74) *Attorney, Agent, or Firm* — Calderone Mckay LLC

(57) ABSTRACT

A system comprises fuel consumption prediction circuitry and user interface circuitry. The fuel consumption prediction circuitry is operable to receive trip constraints for a trip to be made by a vehicle, and vehicle information for the vehicle. The fuel consumption prediction circuitry is operable to generate, based on the trip constraints and the vehicle information, a first trip option having a first predicted travel time and a first predicted fuel consumption, and a second trip option having a second predicted travel time and a second predicted fuel consumption. The fuel consumption prediction circuitry is operable to communicate the first trip option and the second trip option to user interface circuitry. The user interface circuitry is operable to receive the first trip option and the second trip option and present the options to a user.

16 Claims, 17 Drawing Sheets

(56) References Cited

U.S. PATENT DOCUMENTS

| | | | | |
|---|---|---|---|---|
| 2011/0184642 A1* | 7/2011 | Rotz | G01C 21/3492 | 701/533 |
| 2012/0053825 A1* | 3/2012 | Schunder | G01C 21/3469 | 701/123 |
| 2012/0158299 A1 | 6/2012 | Cerecke et al. | | |
| 2013/0046466 A1* | 2/2013 | Yucel | G01C 21/3469 | 701/538 |
| 2013/0151047 A1* | 6/2013 | Choi | B60L 15/2045 | 701/22 |
| 2013/0304380 A1* | 11/2013 | MacNeille | G01C 21/3469 | 701/533 |
| 2014/0107912 A1* | 4/2014 | Yucel | G07C 5/085 | 701/1 |
| 2014/0277971 A1* | 9/2014 | Oshiro | B60W 50/14 | 701/99 |
| 2016/0075333 A1* | 3/2016 | Sujan | G06Q 50/30 | 701/25 |
| 2017/0146362 A1* | 5/2017 | Bai | G01C 21/3492 | |
| 2018/0045525 A1* | 2/2018 | Ara | G01C 21/3469 | |
| 2018/0045526 A1* | 2/2018 | Trancik | G06Q 10/06315 | |
| 2019/0113354 A1* | 4/2019 | Matsumura | G01C 21/3469 | |
| 2019/0318051 A1* | 10/2019 | Oswald | G06F 30/20 | |
| 2019/0367040 A1* | 12/2019 | Kameda | B60W 40/09 | |
| 2019/0375407 A1* | 12/2019 | Maleki | B60W 30/14 | |
| 2020/0070679 A1* | 3/2020 | Wang | B60L 58/21 | |
| 2020/0117207 A1* | 4/2020 | Zhang | B60W 60/001 | |
| 2020/0164885 A1* | 5/2020 | Kujubu | H02P 3/14 | |
| 2021/0139035 A1* | 5/2021 | Jang | B60W 10/08 | |

OTHER PUBLICATIONS

Friedman, Jon. (2006). MATLAB/Simulink for automotive systems design. 87-88. 10.1109/DATE.2006.243988.

Caldeira Fradique, António Luis Mendes. Um Modelo do Efeito do Eco-Drive no Consumo de Combustível de Semirreboques. 2015, Master Science Thesis, Universidade Nova de Lisboa https://run.unl.pt/bitstream/10362/21837/1/Fradique_2015.pdf.

R. Belecheanu, J. C. K. H. Riedel and K. S. Pawar, An investigation of design trade-offs in the automotive industry, 2005, IEEE International Technology Management Conference (ICE), Munich, 2005, pp. 1-10.

Powell B.K. Applied Mathematics and Systematic Automotive Powertrain Synthesis. In: Lasiecka I., Morton B. (eds) Control Problems in Industry. 1995 Birkhäuser Boston.

Brian V. Jadro, The Use of an Onboard Diagnostic Device to Provide Feedback on Driving Behaviors Related to Fuel Economy, Behavior and Social Issues, 26, 190-193 (2017) ©.

Int'l Search Report and Written Opinion Appln No. PCT/IB2021/000259 mailed Sep. 21, 2021.

* cited by examiner

VEHICLE EFFICIENCY PREDICTION AND CONTROL

BACKGROUND

Managing fuel efficiency is important from both environmental and economic perspectives. Accordingly, methods and systems for accurately and effectively managing fuel efficiency are needed.

DETAILED DESCRIPTION

Figure 1:
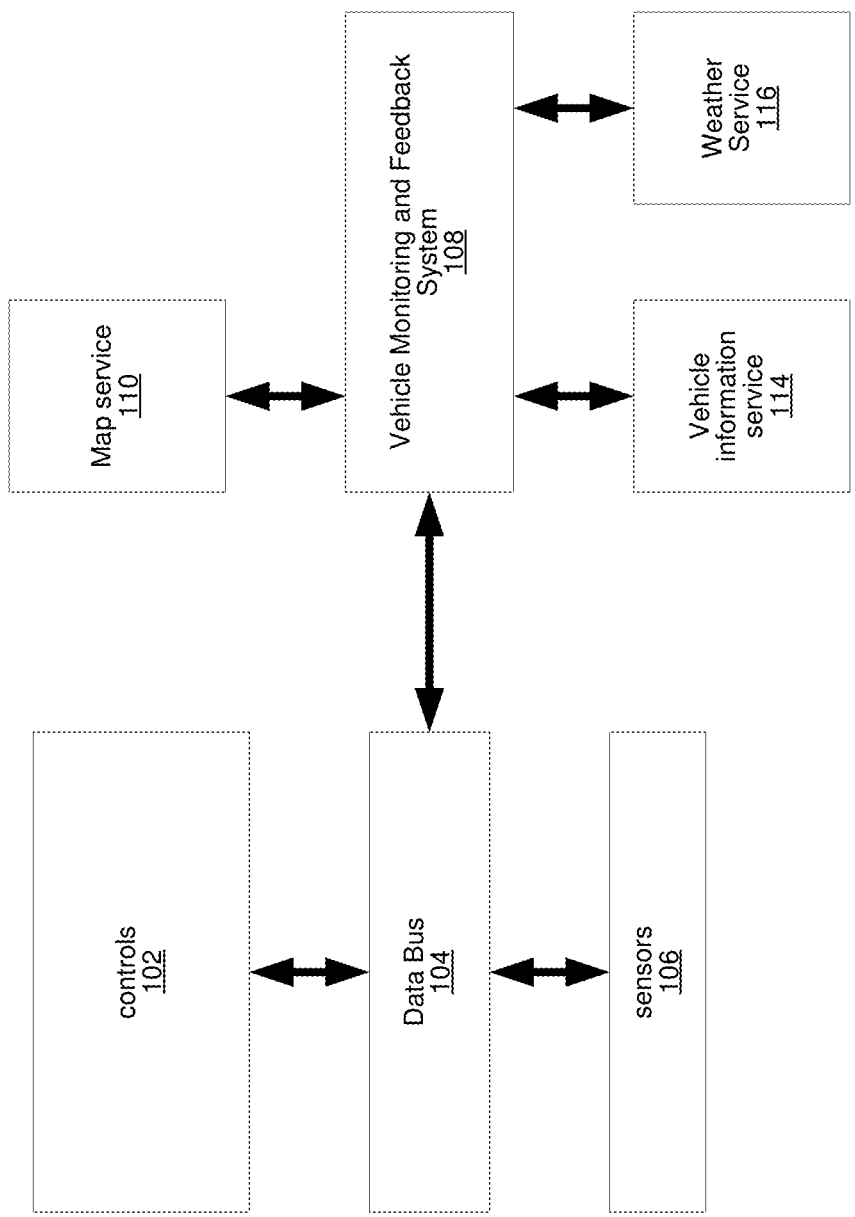
FIG. 1 is a high-level system diagram of a vehicle aided by a vehicle monitoring and feedback system (VFMS).

FIG. 1 is a high-level system diagram of a vehicle aided by a vehicle monitoring and feedback system (VFMS). Shown are controls 102, a data bus 104, and sensors 106 of a vehicle 100. Also shown are the VFMS 108, a mapping service 110, a vehicle information service 114, and a weather service 116.

The controls 102 comprise an accelerator (e.g., a foot-operated pedal for human driver agents and electronically or hydraulically controlled for an autonomous driver agent), brake actuator (e.g., a foot-operated pedal for human driver agents and electronically or hydraulically controlled for an autonomous driver agent), gear selector (e.g., manually, hydraulically, or electronically controlled), and/or other vehicle control systems.

The data bus 104 may comprise one or more optical, conductive, and/or wireless communication paths and associated circuitry for transmitting and receiving data over the bus. The data bus 104 may, for example, adhere to a CANbus standard and communicate data that adheres to a fleet management system (FMS) standard.

The sensors 106 comprise circuitry operable to sense/measure various values such as vehicle speed (wheel based), vehicle speed (from tachograph), accelerator pedal position (0-100%), clutch switch (on/off), brake switch (on/off), cruise control (on/off), pto (status/mode), engine coolant temperature, total fuel used (liters since lifetime), fuel level (0-100%), engine speed (rpm), axle weight (kg), total engine hours (h), vehicle identification number (ASCII), tachograph information, high-resolution vehicle distance, service distance, and/or any other values pertaining to a vehicle.

The mapping service 110 provides maps (e.g., based on GPS coordinates) and related data such as: legal limits on velocity at various points along the roads; elevation or grade (i.e., slope) at various points along the roads; the locations of features such as intersections, signs, etc.; current and/or predicted traffic conditions; etc., The mapping service 110 may be local to the VFMS 108 or may be accessed via an API over a network.

The vehicle information service 114 provides vehicle information useful in predicting fuel consumption of vehicles. Such information may include, for example, throttle demand maps, torque limit maps, brake specific fuel consumption (BSFC) maps, gear ratios, wheel size and type, drag coefficients, cargo capacity, etc. Such data may, for example, be requested based on the make, model, and year of the vehicle. The data may include, for example, ranges of values, nominal values along with correction factors based on parameters such as mileage of the vehicle, weight the vehicle is carrying, environmental conditions (e.g., altitude, temperature, humidity), and/or the like. In one implementation, the data available from the vehicle information service is the result of collecting data (such as available from data bus 104) from large numbers of vehicles over long periods of time and large geographic regions and then analyzing/synthesizing that data to generate the vehicle information made available via the API. The vehicle information service 114 may be local to the VFMS 108 or may be accessed via an API over a network.

The weather service 116 provides weather information such as temperature, humidity, wind speed and direction, and barometric pressure. The weather service 116 API may accept information about a route or routes and then provide weather information along the route or routes. The weather service 116 may be local to the VFMS 108 or may be accessed via an API over a network.

The VFMS 108 is operable to: receive data from the data bus 104, the mapping service 110, the vehicle information service 114, the weather service 116, and/or data directly input by a user (e.g., driver agent, fleet manager, etc.) via a user interface of the VFMS 108; process the received data to determine a current, and/or predict future, states and/or properties of the vehicle 100, predict future states and/or properties of the vehicle 100 (By properties is meant attributes of the vehicle which characterize it, for example, weight, engine torque maps, among others. By states is meant degrees of freedom of a mathematical model of the vehicle—for example, longitudinal and lateral velocity, crankshaft velocity, among others); and/or process the received data to provide information (e.g., in the form of instructions and/or alerts) to a driver agent of the vehicle 100. For example, the VFMS 108 may process the received data to generate multiple trip options for a trip to be made by the vehicle 100, where each option is characterized by different arrival time and fuel consumption. As another example, the VFMS 108 may process the received data to provide recommendations to a driver agent of the vehicle 100 for achieving a desired trade off of travel time and fuel consumption.

Figure 2:
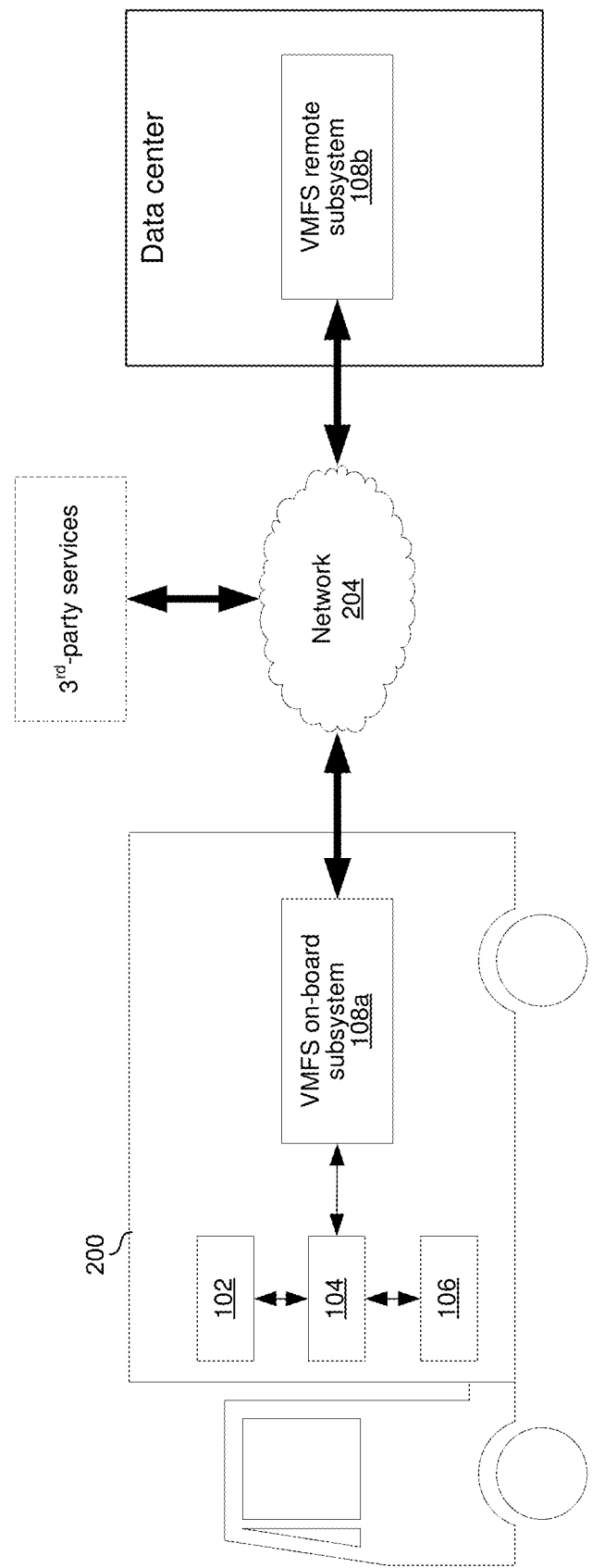
FIG. 2 shows an example implementation of the VFMS of FIG. 1 in which the VFMS comprises an onboard subsystem and a remote subsystem connected via a network.

FIG. 2 shows an example implementation of the VFMS of FIG. 1 in which the VFMS comprises an onboard subsystem and a remote subsystem connected via a network. In this implementation, the VFMS 108 is split into two subsystems 108a and 108b which communicate over a network 204 (e.g., a cellular network). In this example implementation, the subsystem 108a may transmit data from the data bus 104 to the subsystem 108b. The transmission may be at predetermined intervals, opportunistic as resources are available, push-based in response to new data, and/or according to any other schedule or protocol.

Figure 3:
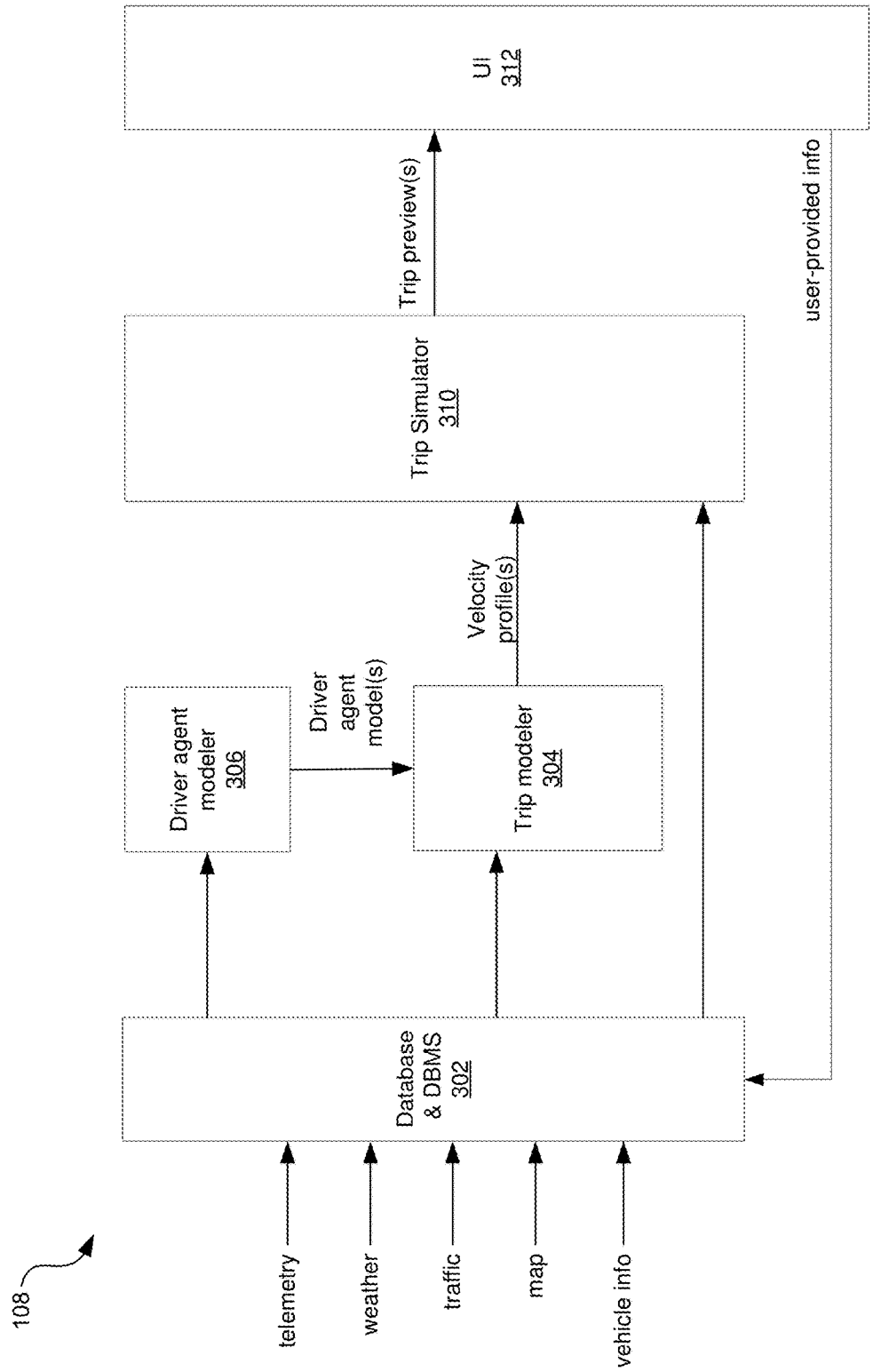
FIG. 3 shows example circuitry of a VFMS.

FIG. 3 shows example circuitry of a VFMS. Shown are a database 302, trip modeler circuitry 304, driver agent modeler circuitry 306, trip simulator circuitry 310, and user interface circuitry 312.

The database and database management system (referred to here simply as "database" for convenience) 302 takes in the data received by the VFMS 108 and makes it available to the rest of the VFMS 108. The database 302 accumulates the various types of information over time, from multiple vehicles and from multiple geographic locations. The database, by grouping information temporarily and geographically, allows the establishment of driving patterns, which may not be known a priori, that are correlated with driving performance, thus enabling the creation of alerts (e.g., auditory, visual, and/or tactile for a human driver agent or programmatic for a machine driver agent) to avoid patterns that negatively impact overall efficiency of the vehicle. Stored history also allows, for example, understanding the evolution of the driving agents and vehicle over time and under various conditions.

The trip modeler circuitry 304 pulls data from the database 302, receives driver agent models from the driver agent modeler 306, and processes the data and driver agent model to generate velocity profiles used by the trip simulator 310. Details of an example implementation of the trip modeler circuitry 304 are described below with reference to FIG. 4.

The driver agent modeler circuitry 306 pulls data from the database 302 and processes that data to generate a one or more driver agent model which it then outputs to the trip modeler 304. Details of an example implementation of the driver agent modeler 306 are described below with reference to FIG. 6.

The trip simulator circuitry 310 is operable to receive the velocity limit profiles from the trip modeler 304 and data from the database 302, and then processes all of that information to simulate the trip with various driver agent models. The result of the simulations is a plurality of trip options, where each trip option may, for example, correspond to a different tradeoff between travel time and fuel consumption.

The user interface circuitry 312 provides a mechanism (e.g., touchscreen and associated drive circuitry) via which users (e.g., driver agents and/or fleet managers) can input data to the VFMS 108. For example, a user may input information about the vehicle (e.g., make, model, etc.), information about a trip to be taken (e.g., starting point, destination, time at which the trip will start, time at which the vehicle needs to reach the destination, stops the vehicle needs to make along the way, etc.), information about the purpose of the trip (e.g., type—such as whether it is hazardous and restricted to certain routes—and/or weight of cargo being transported), and/or the like.

Figure 4:
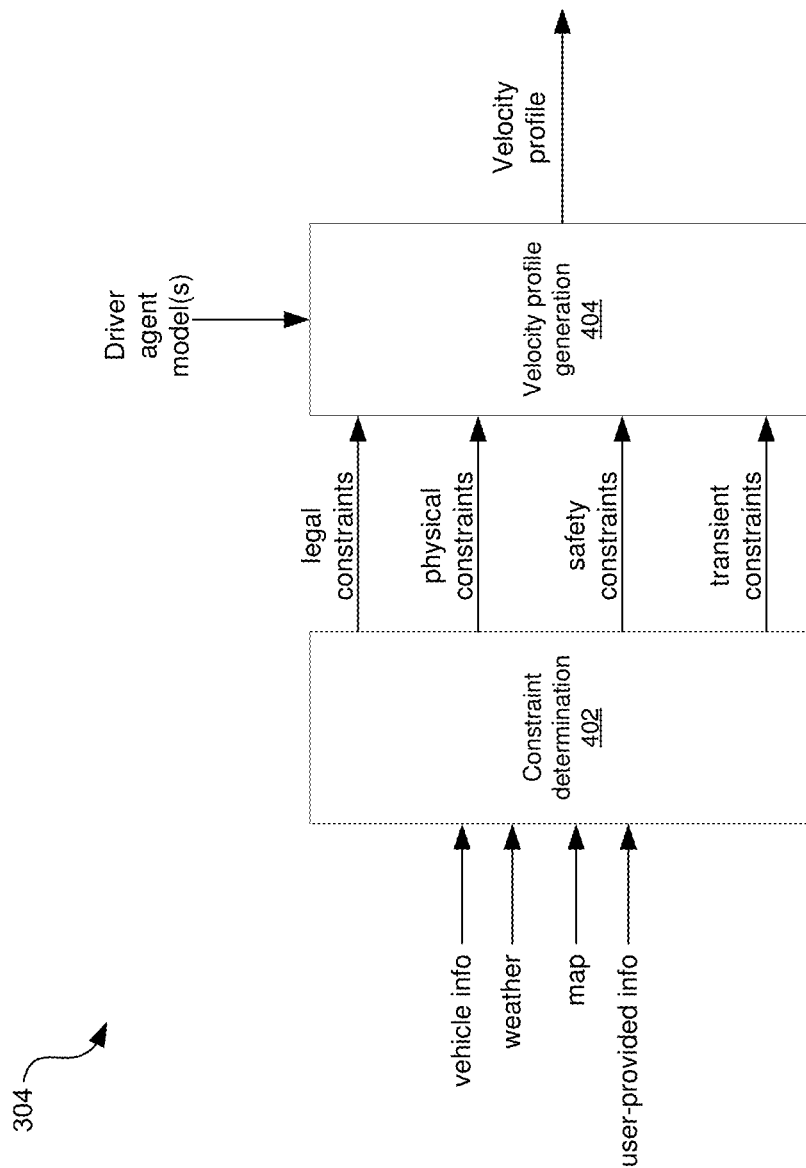
FIGS. 4 and 5 illustrate generation of a velocity profile for use in a vehicle simulation.

FIG. 4 illustrates generation of a velocity profile for fuel efficiency and/or other characteristics of a particular vehicle and a particular trip. The example trip modeler circuitry 304 comprises a constraint determination circuit 402 and a velocity profile generation circuit 404 of the trip modeler circuit 304.

The constraint determination circuit 402 receives vehicle information, weather data, map data, and user-provided information for a trip to be performed. The constraint determination circuit 402 then processes the data to determine legal, physical, safety, and transient constraints on the vehicle's velocity for the trip.

The velocity profile generation circuit 404 uses the various constraints generated by circuitry 402 to generate a composite velocity profile.

Figure 5:
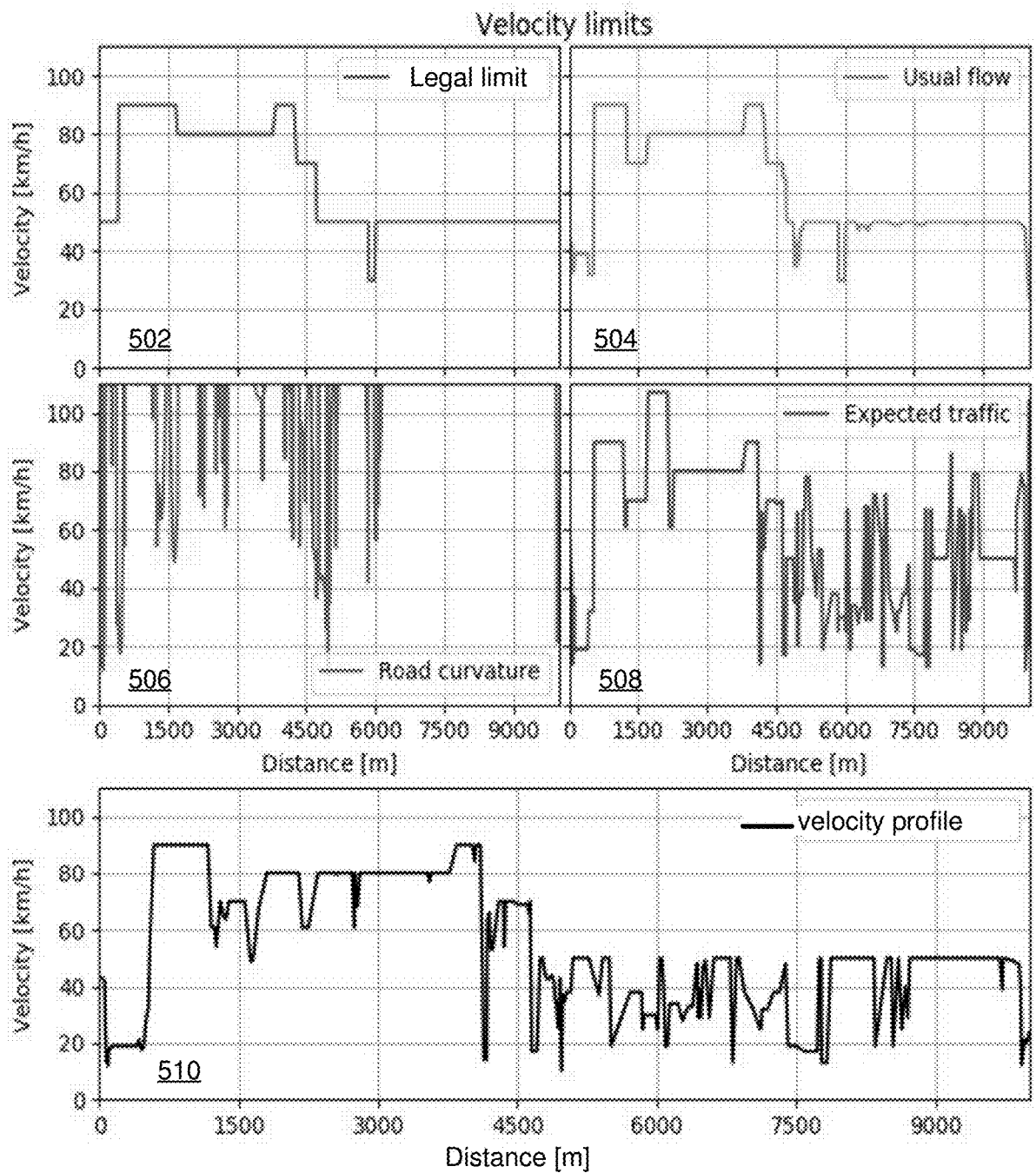

FIG. 5 shows an example composite velocity profile 510 generated based on a legal constraint 502, a practical constraint 504 (e.g., due to limits on stopping and acceleration at stop lights, turns, etc.), a road curvature (i.e., lateral acceleration) constraint 506, and a traffic constraint 508. In each graph, the X axis represents velocity in kilometers per hour and the x axis is the distance along the route to be traveled (~9500 m in the example shown). The resolution of the profile may be, for example, 100 m (i.e., each constraint has a data point every 100 m). In the example shown, the velocity profile 510 is the minimum of the four constraints at each point along the route. In other implementations, the velocity profile generation circuit 404 may use different and/or additional constraints in generating the velocity profile 510.

Figure 6:
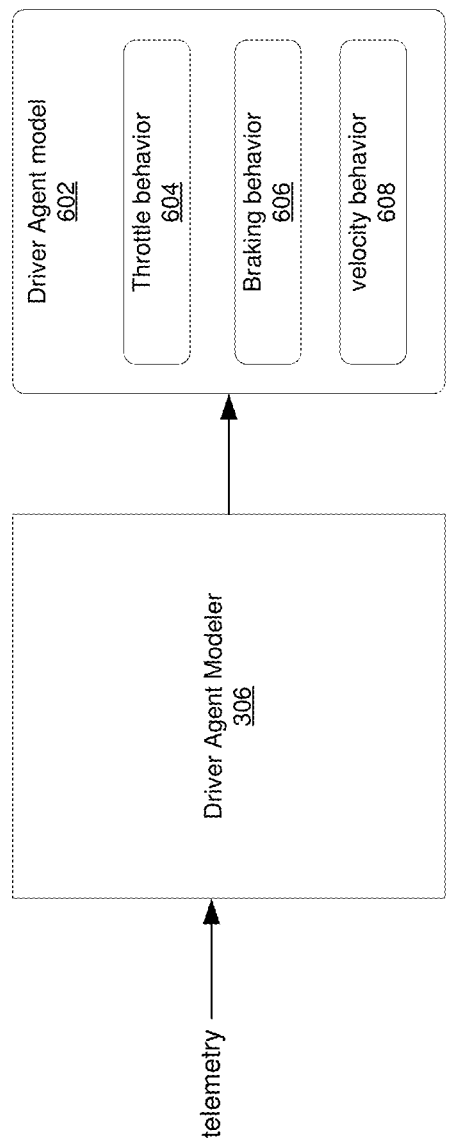
FIG. 6 shows a driver agent modeling circuitry generating an example driver agent model.

FIG. 6 shows a driver agent modeling circuitry generating an example driver agent model. The driver agent modeler 306 receives telemetry data and processes the telemetry data to generate a plurality of driver agent models 602, each of which may model one or more of throttle behavior 604, braking behavior 606, and velocity behavior 608.

The telemetry data may include recent (e.g., within the past few minutes or hours) data about the vehicle 200, historical (e.g., collected over weeks, months, or years) data about the vehicle 200, recent data from other vehicles in similar and/or different locations as the vehicle 200, and/or historical data from other vehicles in similar and/or different locations as the vehicle 200. The telemetry data may be contextualized in the database 302 such that the most-relevant telemetry data (e.g., for the same or similar vehicles as the vehicle 200, the same or similar routes as the route to be traveled for the trip, same or similar weather conditions, etc.) can be pulled for use in generating the driver agent models.

The throttle behavior 604 of a driver agent model may, for example, be represented as a mathematical equation for the position of the accelerator (e.g., from 0 to 100%) over time and under different road grades and weather conditions.

The braking behavior 606 of a driver agent model may, for example, be represented as a mathematical equation for the position (e.g., from 0 to 100%) of the brake pedal over time and under different road grades and weather conditions.

The velocity behavior 608 of a driver agent model may, for example, be represented as a function of the average vehicle velocity over time and under different road grades and weather conditions.

Figure 7:
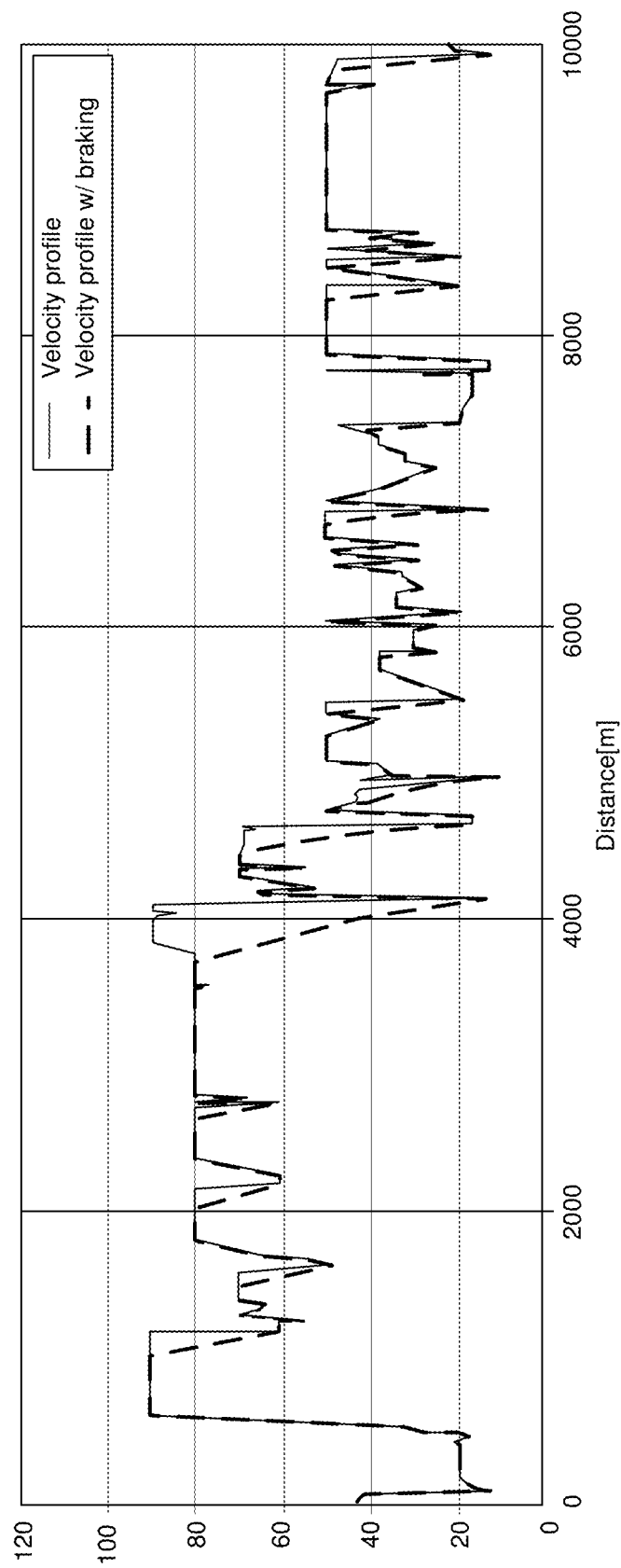
FIG. 7 shows the velocity profile of FIG. 5 modified by braking constraints specific to the particular vehicle and trip.

FIG. 7 shows the velocity profile of FIG. 5 modified by braking constraints specific to the particular vehicle and trip. The solid line in FIG. 7 is the same velocity profile 510 from FIG. 5. The dashed line then represents a modified velocity profile where safe braking distance has been taken into account. The safe braking distance depends on characteristics of the weather (e.g., wet or dry), vehicle (e.g., empty or loaded with cargo), and road (e.g., road grade).

The dashed line in FIG. 7 thus corresponds, in an example implementation, to the shortest possible time to safely complete the trip, given the particular vehicle, cargo, weather, etc. This profile could then be fed into the trip simulator 310 as the target profile for the 'FAST' trip option of FIG. 16. The profile can then be further modified by driving behaviors to generate additional target profiles (e.g., for the "ECO MODE" and "MODERATE" trip options).

In an example implementation, for the forward acceleration, the simulation is based on a discrete steady-state point mass simulation theory. Since the trip simulator 310 has knowledge of the future target velocity (from the target profile), it works by computing the required torque that the engine must produce to overcome all the dissipative forces and generate the required acceleration to achieve the target velocity in the next step, as:

$$vel_{k+1} = \int_k^{k+1} ((m*g(\sin(\theta_k)) + c_{rr}(vel_k, p)) + (1/2)C_d * \rho * A * (vel_k)^2 + F_{motor})/m)dt + vel_k$$

$$F_{motor} = \min(m * \partial(vel_k - vel_t)/\partial t, (T_{nominal} * T_{limit}(\text{rpm}) * G_{ratio}(\text{gear}) * G_{diff})/r_{wheel})$$

where, $F_{motor}$ is the force the vehicle can produce at a given time, $T_{nominal}$ is the nominal torque of the motor, $T_{limit}$ (rpm) is the torque limitation, $G_{ratio}$(gear) is the transmission ratio with a specified gear, $G_{diff}$ the differential ratio, $r_{wheel}$ the wheel radius, m the vehicle mass, g the gravity acceleration, $\vartheta_k$ the slope at the point k, $c_{rr}$ the rolling resistance coefficient also dependent of the tyre pressure, $C_d$ the vehicle aerodynamic drag coefficient, $\rho$ the air density, A the vehicle incident area, $vel_k$ the current velocity, and $vel_t$ the target velocity.

Figure 9:
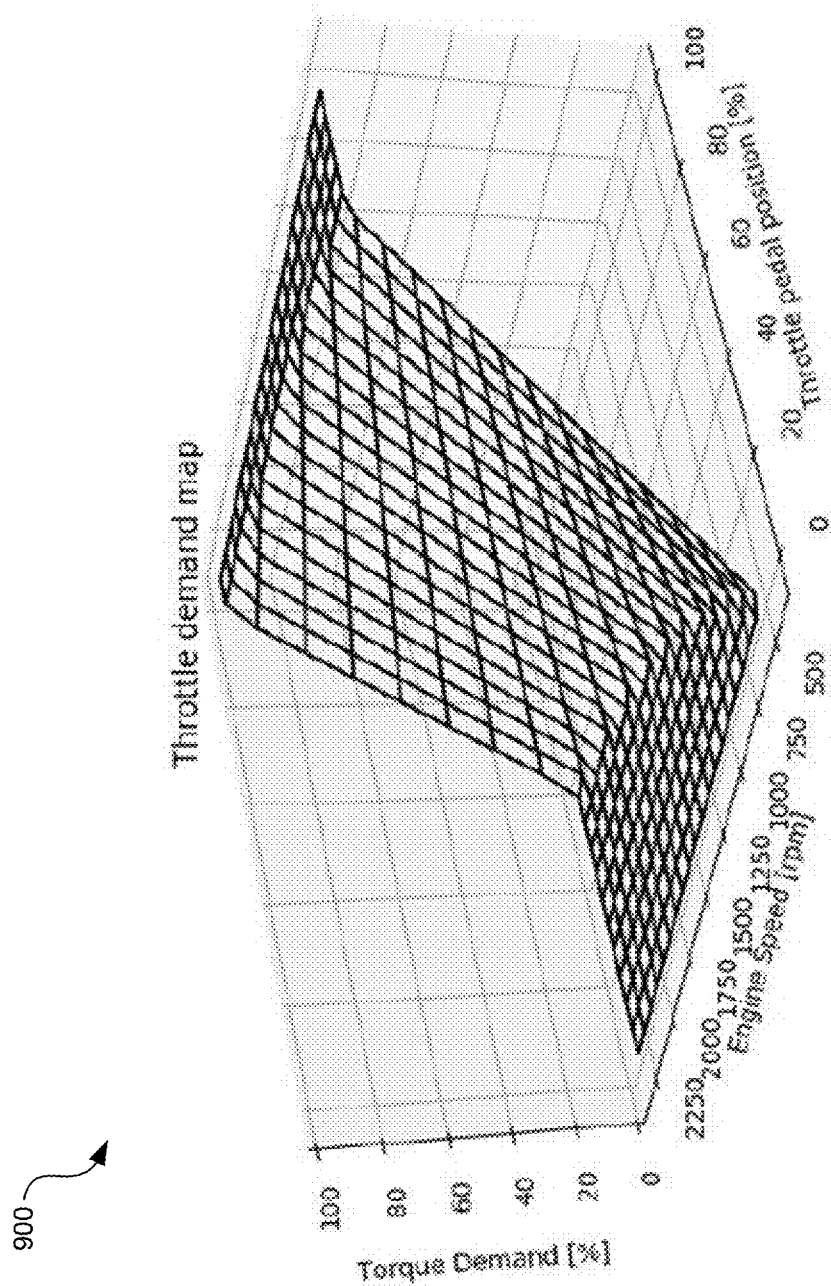
FIG. 9 shows an example torque demand map used by the simulator of FIG. 8.

A driver agent normally controls the velocity of the vehicle 200, however the throttle pedal only controls a torque demand to the motor, through a throttle demand map that converts a percentage of pedal to a torque demand value. An example throttle demand map 900 is shown in FIG. 9. The y axis represents engine speed in rpm, the x axis represents throttle pedal position as percentage (100%=fully depressed), and the z axis represents torque demand (100%=maximum torque).

Figure 10:
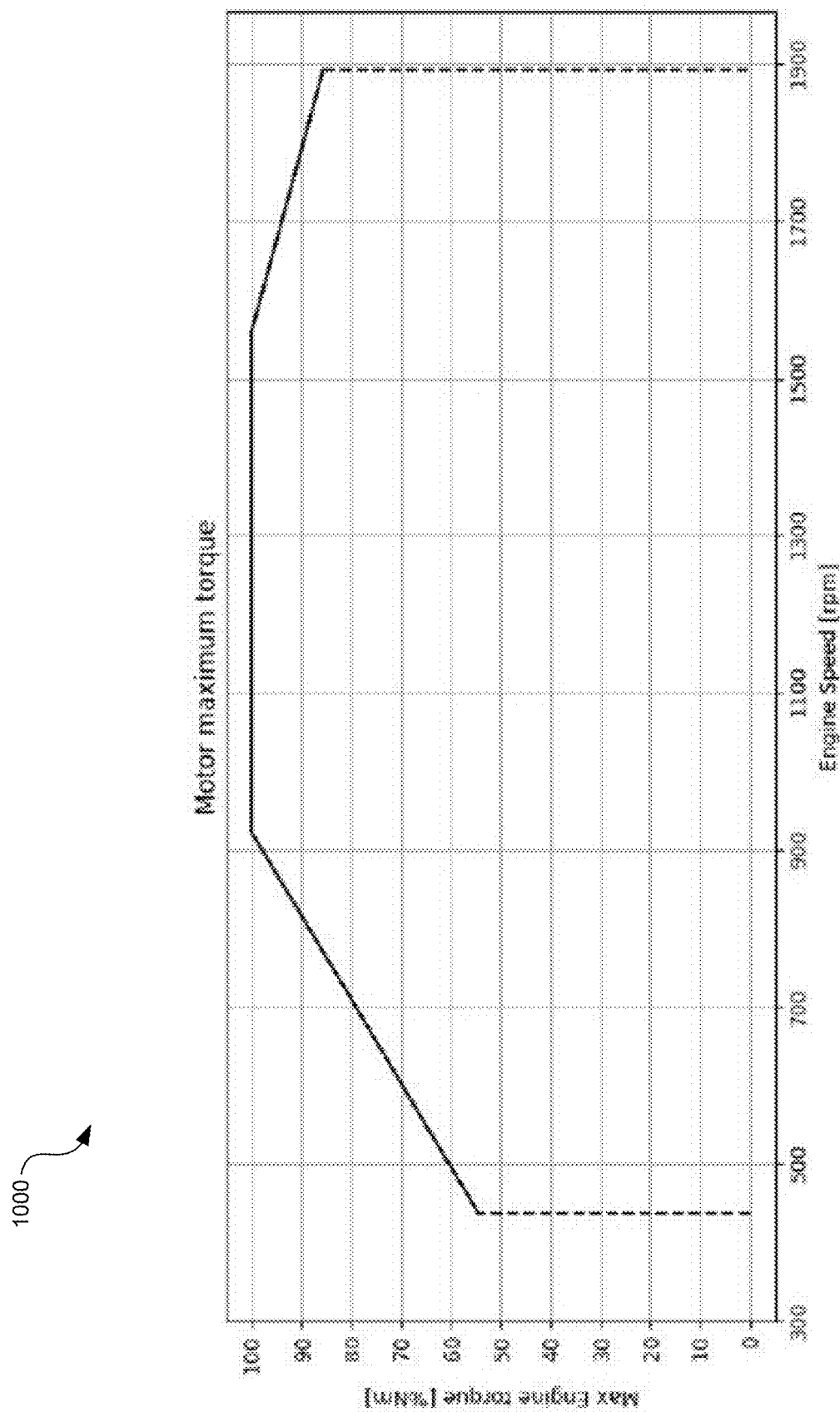
FIG. 10 shows an example torque limit map used by the simulator of FIG. 8.

To the torque demand is added the required power for the vehicle accessories (electric systems, A/C, etc. . . . ). However the motor has a torque limit that depends on the current motor velocity. This is represented as a torque limit map. This map crops the demand torque to the maximum available at the current rpm point. An example torque limit map is shown in FIG. 10. The horizontal axis represents engine speed in rpm and the vertical axis represents maximum engine torque. The dashed lines represent the limits of a good working rpm range for the particular motor of the vehicle 200. Note that the highest allowed rpm is the point of max power of the motor.

For a given torque reference, the motor of vehicle 200 consumes air and fuel and gives power in the form of torque and angular velocity. In an example implementation, to keep the simulation fast and lightweight while still providing high accuracy, the trip simulator 310 assumed that the reference torque is delivered instantly, and the increase of angular velocity is a result of the torque surplus.

The power from the motor it's then passed through the transmission and differential to the wheels, where the balance between that power and the dissipative forces results in a velocity variation of the vehicle. The dissipative forces can be reduced to two main sources: aerodynamic drag and rolling resistance.

When it is not possible to achieve the required torque, whether due to motor limitations, excess weight or dissipative forces, the trip simulator 310 uses the available torque that minimizes the error to the target velocity.

Figure 11:
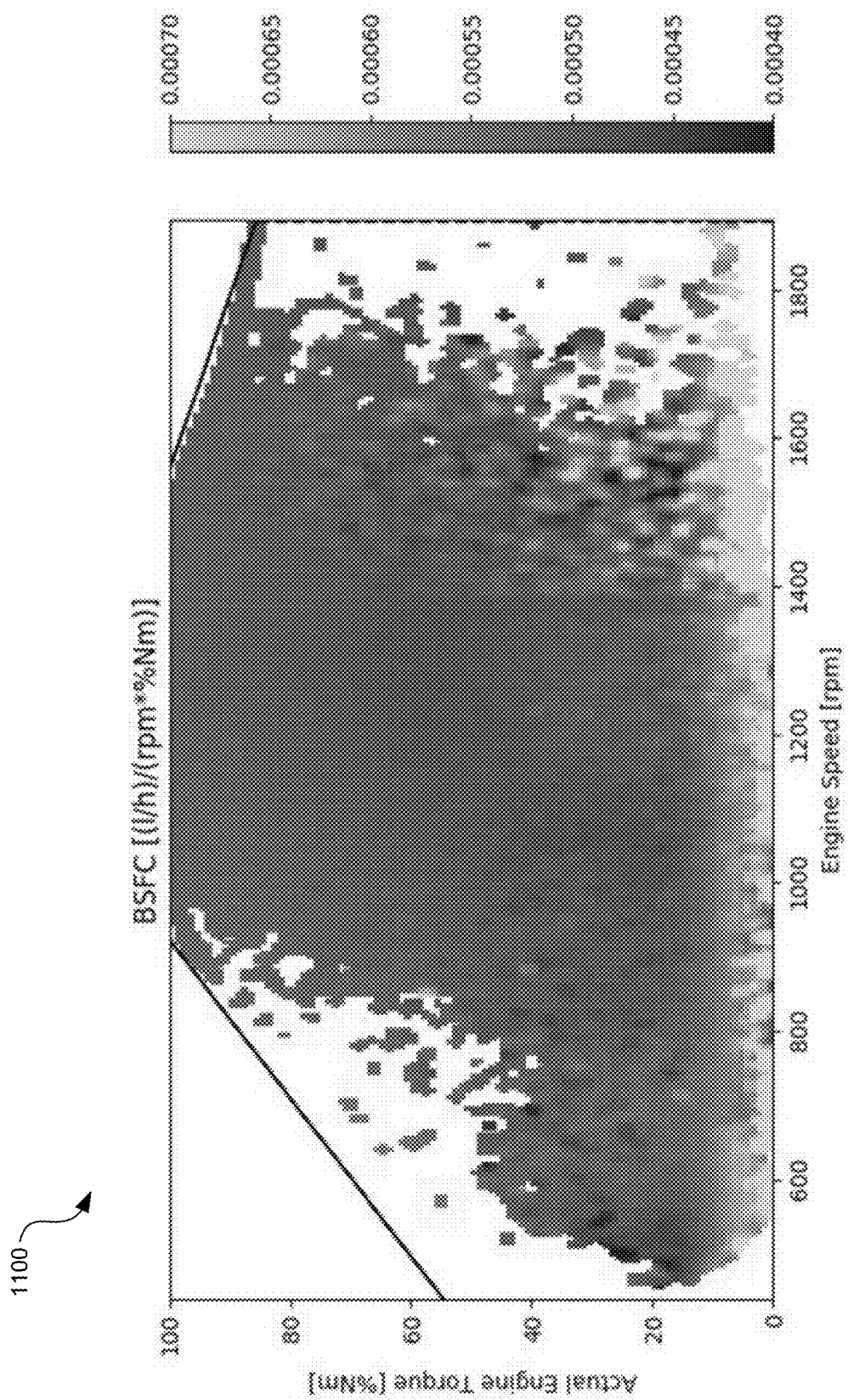
FIG. 11 shows a graph of an example brake specific fuel consumption (BSFC) map used by the simulator of FIG. 8.

The trip simulator 310 the computes the fuel rate computed from the current torque and motor velocity through a Brake Specific Fuel Consumption (BSFC) map, which relates the motor torque and angular velocity with the fuel rate, taking in consideration the motor efficiency for the work map. An example BSFC map is shown in FIG. 11. The horizontal axis represents engine speed, the vertical axis represents actual engine torque, and the shade represents the rate of fuel consumption.

For each step, having determined the state of the motor, it is possible to choose the transmission gear that minimizes the instantaneous BSFC, and the total fuel consumption can be computed as:

$$\text{Fuel} = \int_0^\infty \left(BSFC(\text{rpm}, (F_{motor} * r_{wheel})/G_{ratio}(\text{gear}) * G_{diff})\right)dt$$

Figure 8:
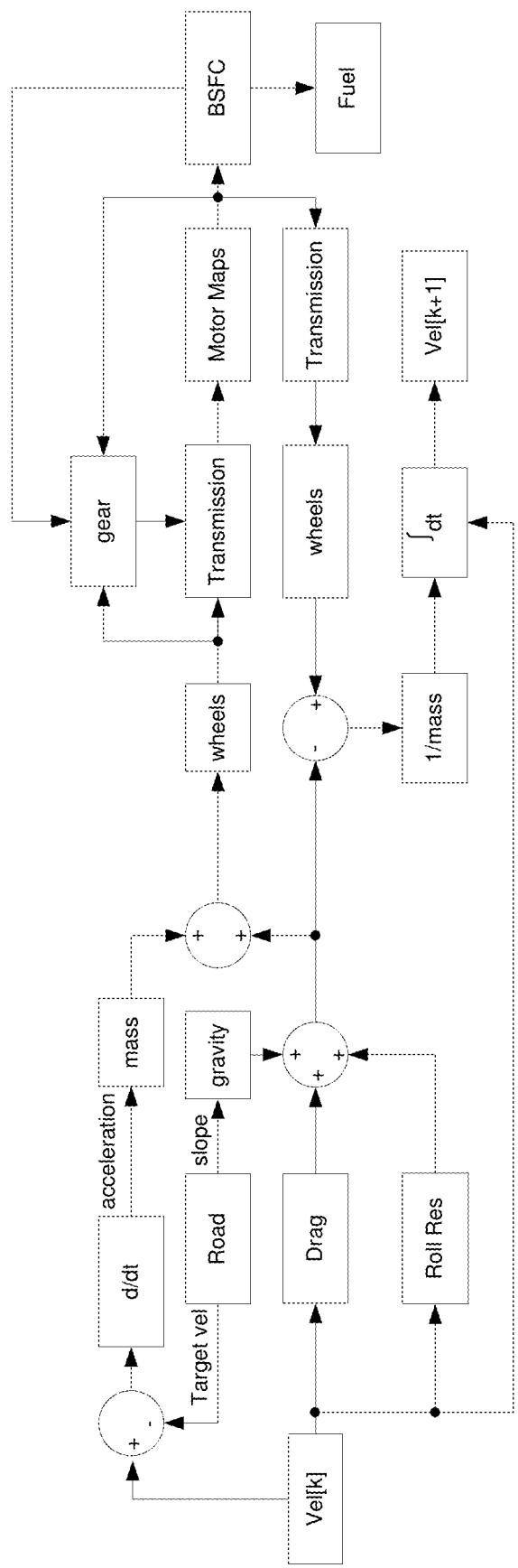
FIG. 8 shows example simulator circuitry operable to simulate fuel efficiency under different driver agent behaviors for a particular vehicle and trip.

Circuitry of the trip simulator 310 for implementing these computations can be seen in FIG. 8.

Figure 12:
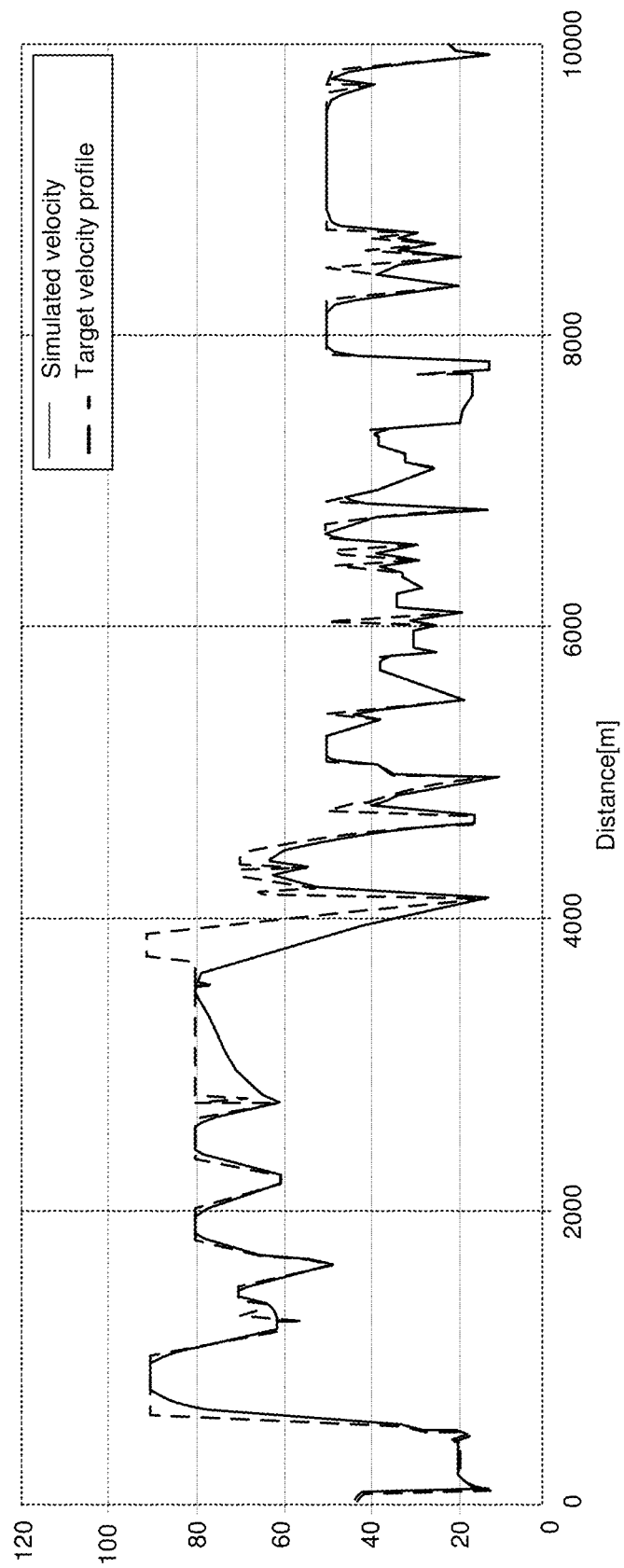
FIG. 12 shows a simulation result using the velocity profile of FIG. 7 as a target.

FIG. 12 shows a simulation result (the solid line) using the velocity profile of FIG. 7 (the dashed line) as a target. As can be seen in FIG. 12, using a target profile that targets minimum travel time results in the vehicle 200 making useless accelerations to brake almost immediately, which results in high fuel consumption. By using a driver agent model which imposes additional constraints, fuel consumption for the trip can be reduced. This is shown in FIG. 13.

Figure 13:
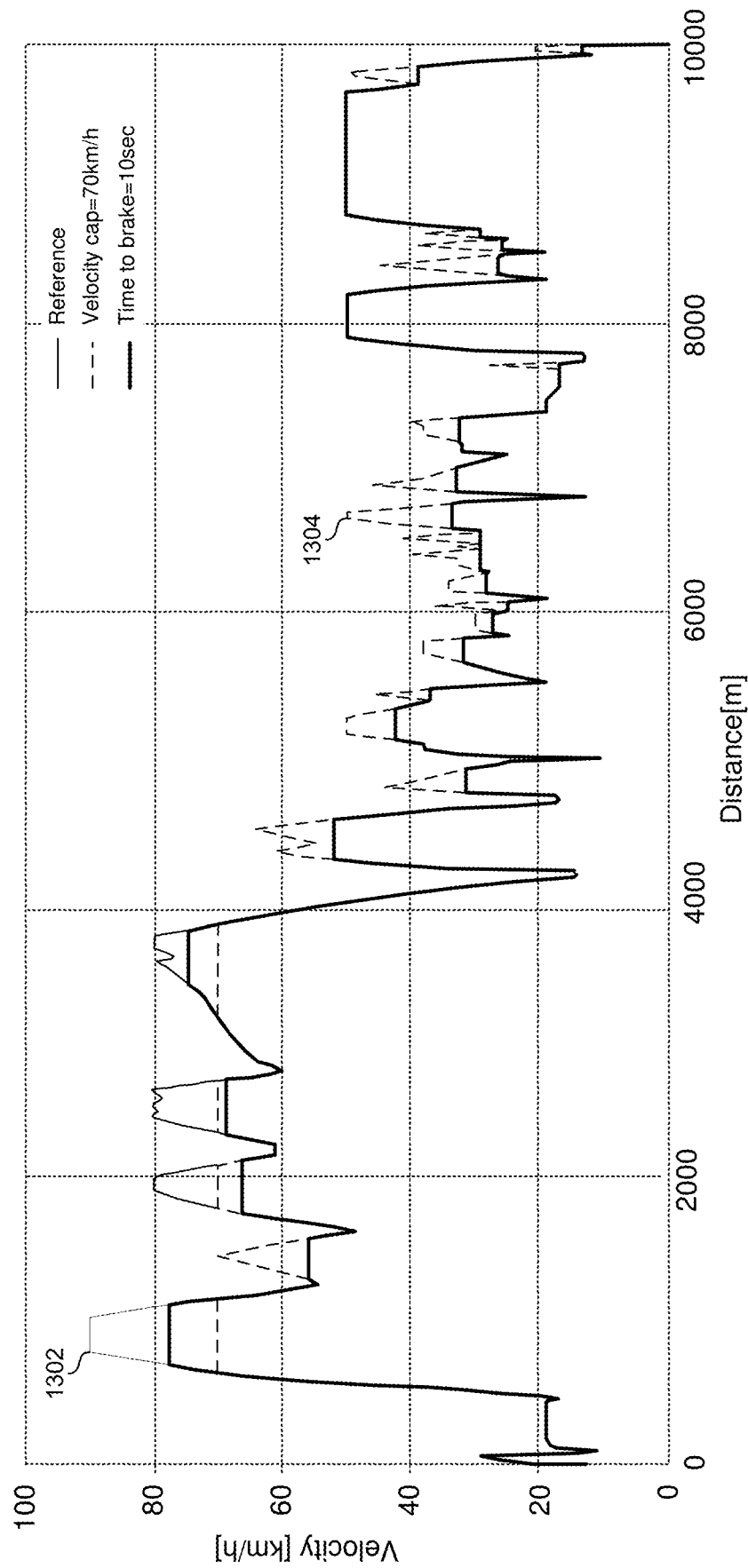
FIG. 13 illustrates the impact of driver agent behavior on a velocity profile used by the trip simulator.

FIG. 13 illustrates the impact of a driving behavior where the maximum velocity is capped below the legal limit (at least for some portion of the trip), and the impact of a driving behavior where acceleration ceases ahead of braking by a defined amount of time (10 seconds in the example shown). The thin line in FIG. 13 represents the target velocity profile for minimum travel time (the "reference" profile, which corresponds to the target velocity profile of FIG. 12). The dashed line in FIG. 13 corresponds the reference profile modified by velocity behavior which restricts the maximum velocity to 70 km/h. The heavy line in FIG. 13 represents the reference profile modified by a throttle behavior that stops accelerating 10 seconds before times at which braking will be necessary. As can be seen, the velocity behavior clips the high-velocity spikes such as 1302, and the braking behavior clips the low-velocity spikes such as 1304.

While both driver agent behaviors of FIG. 13 help reduce the fuel consumption (less accelerations equals less fuel), they also increase the travel time, which is an important parameter. Accordingly, in an example implementation, the target velocity profiles fed into the trip simulator 310 use a plurality of driver agent models with different combinations of velocity behavior and braking behavior to find suitable trip options exhibiting different tradeoffs of travel time and fuel consumption.

Figure 14:
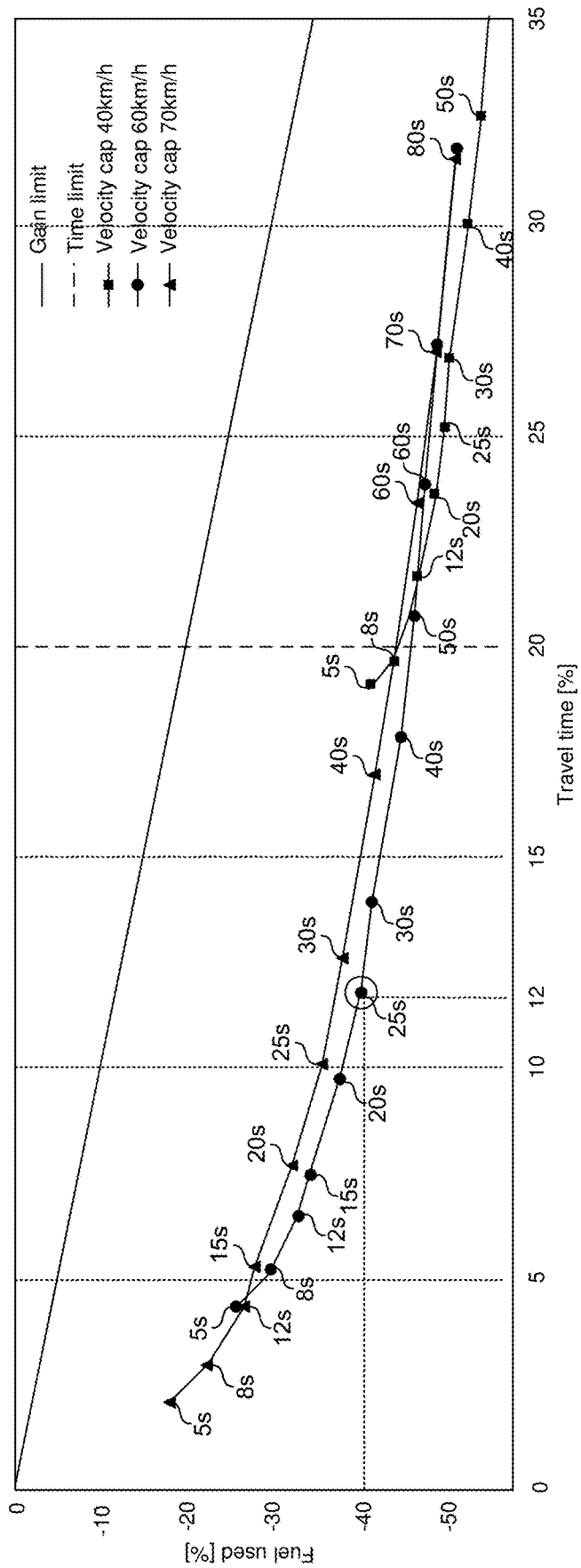
FIG. 14 shows example simulations results for various driver agent models.

FIG. 14 illustrates the results of multiple simulations using a combination of velocity limits and time to brake values, with a time of arrival constraint that the trip cannot take more than 20% longer than the baseline ('FAST') option. Also, in this example, to find a balanced point is defined that the importance of fuel saved to time increment is 1:1 (i.e., they are equally important). FIG. 14 shows the simulation results for three different velocity behavior curves (limited to 40 km/h, 60 km/h, and 70 km/h, respectively) with points marked along the curves corresponding to different braking behaviors (each labeled with the time to brake in seconds). The balanced point found for 1:1 ratio is at 60 km/h with 25 sec of time to brake. This profile gives a 40% fuel reduction to only a 12% time increase compared to the baseline.

In reality, however, human driver agents will not typically be able to adhere precisely to the optimal driving behavior. Nevertheless, the VFMS can typically find a driving behaviors that the driving agent adheres to sufficiently to improve fuel consumption without an unacceptable increase in travel time. In this regard, the VFMS may provide instructions and alerts (e.g., auditory, visual, and/or tactile for a human driver agent or programmatic for a machine driver agent) that are tailored to the particular driver agent (based on a driver agent model that best matches the driver agent's natural driving tendencies) to maximize the impact of the instructions and notifications. For example, knowing that a particular driving agent has poor braking performance in a particular path, throttle-related alerts may be silenced so that the driver agent can focus on braking-related alerts. The alerts may be forward-looking based on upcoming road features, obstacles, etc. such that the driver agent has time to implement an action recommended by the alert and achieve energy savings, increased safety, and/or other benefits. A model of the particular driver agent may, for example, be determined through clustering techniques (e.g., K-MEANS method), which enable determining a suitable model of the driver agent without a priori knowledge of the possible models or even how many different diver agent models exist. This may be accomplished simply by measuring the disparity between the stored information and how it correlates, for example, to the fuel consumption. Such mathematical methods fall into the category of unsupervised Learning. Additionally or alternatively, the model of the particular driver agent may be determined from several previously identified driver agent models. These previously-identified models can be defined, for example, empirically, and a model for detecting them can be constructed from historical data in the database 302, through logistic regression. This kind of mathematical methods falls within the category of supervised learning. The identification of the driver agent model, in short, gives a greater real-time perception of the traits of the particular driver agent, which allows acting effectively in order to solve the performance fragilities thereof. These methods can identify, for example, which particular driving agent is strongly identified with model A and weakly with model B, where model A is related to the pressing of the accelerator pedal and model B is related to the pressing of the brake pedal. This result can serve as a filter to generate more targeted and effective suggestions in order to increase the overall efficiency of the vehicle, which is predominantly affected by the driving profile of the driving agent.

Figure 15:
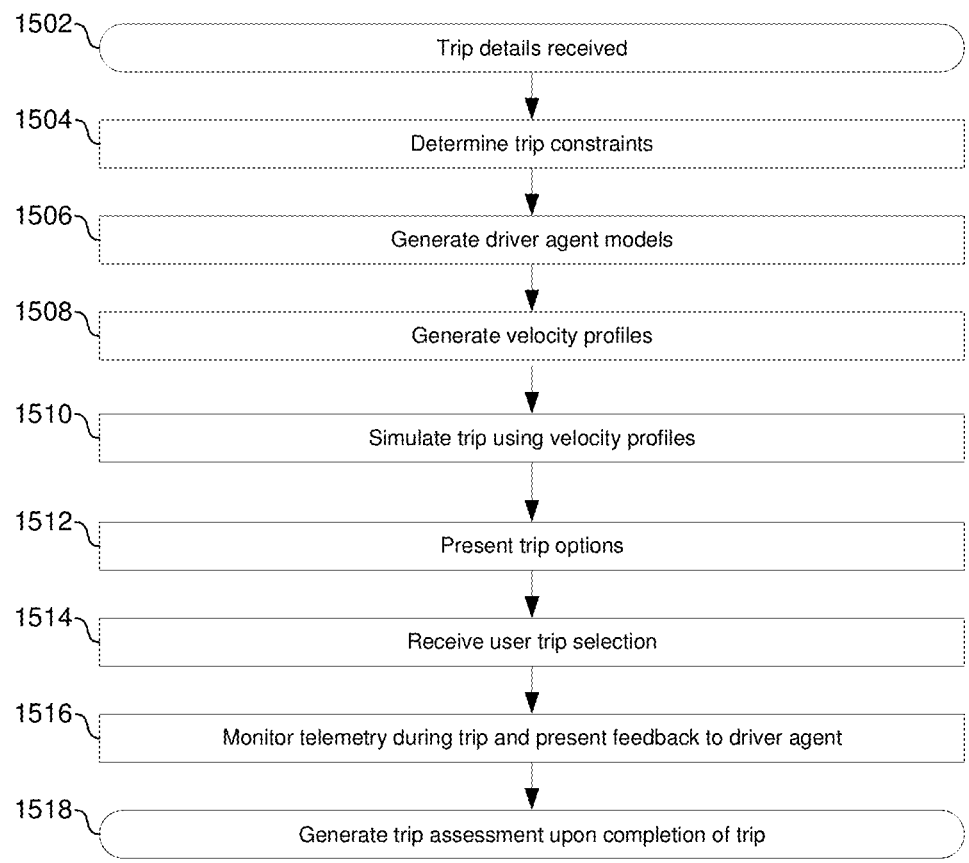
FIG. 15 is a flowchart for generating navigation instructions based on fuel consumption simulation results.

FIG. 15 is a flowchart for generating navigation instructions based on fuel consumption simulation results.

The process begins in block 1502 in which a user enters trip details into the user interface 312 of the VFMS 108. These details could include, for example, starting location, destination, time of departure, deadline for arrival, stops along the way, vehicle information, and/or any other information about the trip.

In block 1504, the constraint determination circuitry 402 determines legal, physical, safety, and/or transient constraints.

In block 1506 the diver agent modeler 306 generates a plurality of driver agent models. In an example implementation, each of the models is characterized by one or more of a velocity behavior, throttle behavior, and braking behavior.

In block 1508, the velocity profile generation circuitry 404 generates a plurality of target velocity profiles based on the constraints determined in block 1504 and the driver agent models generated in block 1506.

In block 1510, the trip simulator 310 simulates the trip using the velocity profiles to generate a plurality of trip options, each corresponding to a different tradeoff of travel time ad/or time of arrival and fuel consumption.

Figure 16:
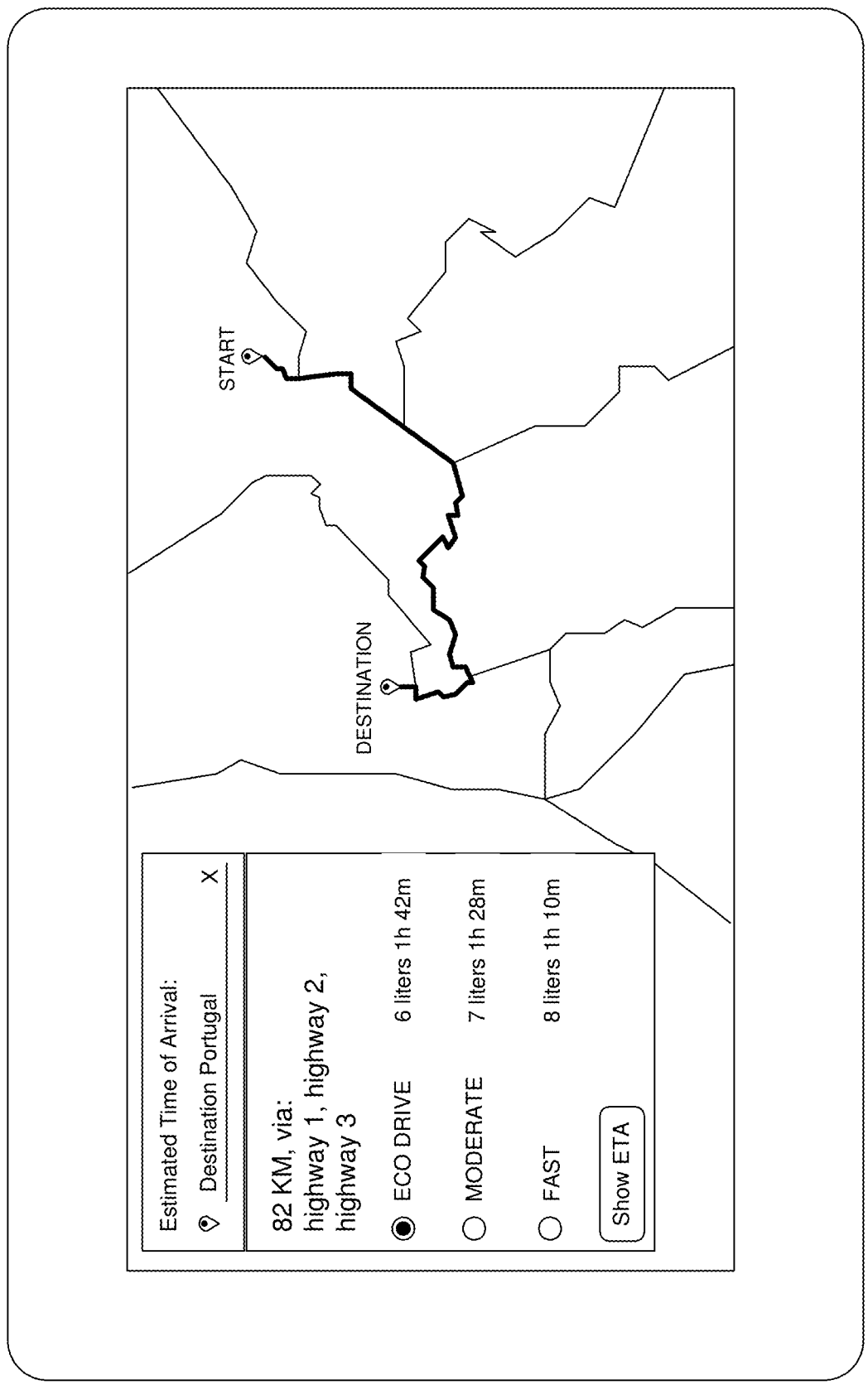
FIG. 16 shows an example user interface presenting trip options with different tradeoffs of arrival time and fuel consumption.

In block 1512, the user interface circuitry 1312 presents the trip options (e.g., as shown in FIG. 16).

In block 1514, the VFMS receives the user's selection of one of the trip options.

Figure 17A:
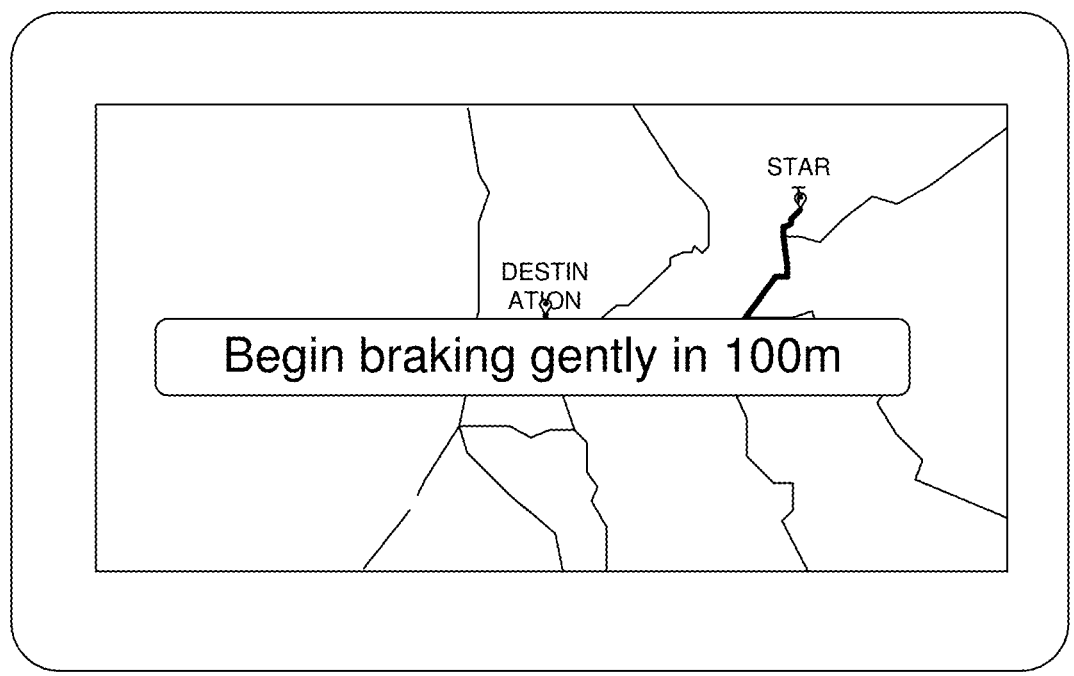
FIGS. 17A and 17B illustrate example in-advance notifications for managing fuel consumption.
Figure 17B:
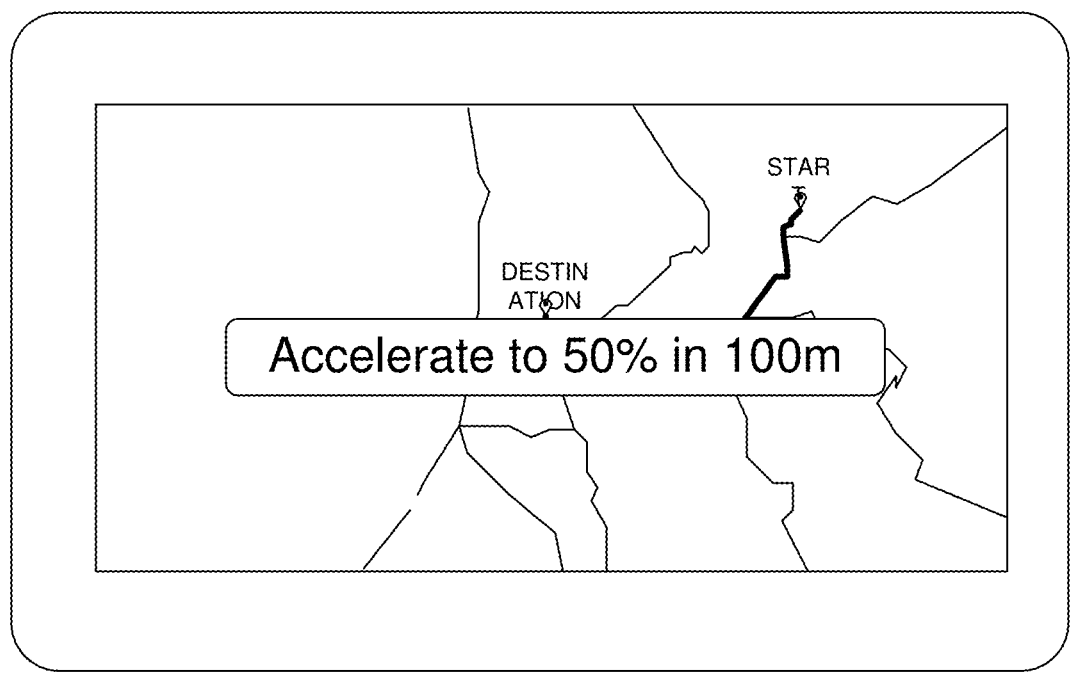

In block 1516, while the trip is in progress, the VFMS 108 processes telemetry from the vehicle and provides feedback to the user. For example, the VFMS 108 provides instructions and alerts (e.g., as shown in FIGS. 17A and 17B) for velocity, throttle, and/or braking behavior so as to help the driver agent match the velocity profile of the chosen trip option.

In block 1518, upon completion of the trip, a trip assessment is generated and presented to the user. The assessment may, for example, illustrate how well the driver agent adhered to the selected trip option; how well the driver agent followed the alerts that were presented, how efficiently the driver used the brake, how efficiently the driver used the throttle, and/or the like.

In accordance with an example implementation of this disclosure, a system may comprise fuel consumption prediction circuitry (e.g., 304, 306, and 310) and user interface circuitry (e.g., 312). The fuel consumption prediction circuitry is operable to: receive trip constraints for a trip (e.g., for the trip from 'START' to 'DESTINATION' in FIG. 16) to be made by a vehicle (e.g., truck 200); and receive vehicle information for the vehicle. The fuel consumption prediction circuitry is operable to generate, based on the trip constraints and the vehicle information, a first trip option (e.g., the 'ECO DRIVE' option of FIG. 16) having a first predicted travel time and a first predicted fuel consumption, and a second trip option (e.g., the 'MODERATE' option of FIG. 16) having a second predicted travel time and a second predicted fuel consumption. The fuel consumption prediction circuitry is operable to communicate the first trip option and the second trip option to user interface circuitry (e.g., via a data bus in FIG. 1 or via a REST API in FIG. 2). The user interface circuitry is operable to receive the first trip option and the second trip option and present the options to a user (e.g., via GUI such as shown in FIG. 16). The user interface circuitry is operable to receive input from the user (e.g., via voice and/or touch) indicating a selected trip option from among the first trip option and the second trip option; and present driving instructions based on the selected trip option. The fuel consumption prediction circuitry may be operable to run a simulation of the trip based on the vehicle information and the trip constraints. The first predicted travel time, first predicted fuel consumption, second predicted travel time, and second predicted fuel consumption may be outputs of the simulation. The fuel consumption prediction circuitry is operable to generate a velocity limit profile (e.g., the velocity limit profile of FIG. 5 or the velocity limit with braking profile of FIG. 7) based on one or more of the trip constraints. The fuel consumption prediction circuitry may be operable to run a simulation of the trip based on the vehicle information and the velocity limit profile. The velocity limit profile may indicate a vehicle velocity for each of a plurality of points along a route of the trip (e.g., a recommended or max velocity for each road or 1 km section of road along the route). The system may comprise driver agent modeler circuitry (e.g., 306) operable to generate multiple driver agent models (e.g., 602). The fuel consumption prediction circuitry may be operable to run multiple simulations of the trip based on the vehicle information, the trip constraints, and the multiple driver agent models. The first predicted travel time and first predicted fuel consumption may be outputs of a first of the multiple simulations, and the second predicted travel time and second predicted fuel consumption may be outputs of a second of the multiple simulations. Each of the driver agent models may comprises one or more of: driver agent throttle behavior (e.g., 604), driver agent braking behavior (606), and driver agent velocity behavior (e.g., 608). The first predicted travel time and first predicted fuel consumption correspond to a first of the multiple driver agent models having a first throttle behavior (e.g., a driver agent model with higher throttle acceleration), and the second predicted travel time and second predicted fuel consumption correspond to a second of the multiple driver agent models having a second throttle behavior (e.g., a driver agent model corresponding with lower throttle acceleration). The first predicted travel time and first predicted fuel consumption may correspond to a first of the multiple driver agent models having a first braking behavior (e.g., a driver agent model corresponding to a driver with higher brake pedal acceleration), and the second predicted travel time and second predicted fuel consumption correspond to a second of the multiple driver agent models having a second braking behavior (e.g., a driver agent model corresponding to a driver with lower brake pedal acceleration). The first predicted travel time and first predicted fuel consumption may correspond to a first of the multiple driver agent models having a first velocity behavior (e.g., a driver agent model corresponding to a driver who tends to exceed the legal velocity limit), and the second predicted travel time and second predicted fuel consumption correspond to a second of the multiple driver agent models having a second velocity behavior (e.g., a driver agent model corresponding to a driver who tends to stay at or below he legal velocity limit). The vehicle information may comprises one or more of: a throttle demand map (e.g., 900), a maximum torque map (1000), and a brake specific fuel consumption map (1100). The trip constraints comprise legal velocity limits for one or more sections of road to be traveled during the trip (i.e., limits posted on roadside signage). The trip constraints may comprise physical characteristics (e.g., road grade, road curvature, and road composition such as asphalt, dirt, etc.) of one or more sections of road to be traveled during the trip. The trip constraints may comprise transient conditions (e.g., traffic and/or weather conditions) expected during the trip. The trip constraints may comprise safety constraints (e.g., safe braking acceleration-how fast the vehicle can stop with an acceptable low probability of damage to person or property, and/or safe lateral acceleration-how sharply the vehicle can turn with an acceptably low probability of damage to person or property). The driving instructions may include instructions on when and/or how much to brake in order to achieve the predicted fuel consumption and predicted arrival time for the selected trip option. The driving instructions may include instructions on when and/or how much to accelerate in order to achieve the predicted fuel consumption and predicted arrival time for the selected trip option.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Each discrete ASIC, FPGA, Processor, or other circuit may be referred to as "chip," and multiple such circuits may be referred to as a "chipset." Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example). "Fuel" as used in this disclosure can refer to gasoline, diesel, battery charge, natural gas, and/or any other energy source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
fuel consumption prediction circuitry; and
user interface circuitry;
wherein the fuel consumption prediction circuitry is operable to:
receive trip constraints for a trip to be made by a vehicle;
receive vehicle information for the vehicle, wherein the vehicle information
comprises an engine torque limit;
receive a driver agent model of a torque demand that varies as a function of
an engine speed and as a function of a position of an accelerator,
wherein the position of an accelerator is represented as a mathematical equation for a position of an accelerator, and wherein the mathematical equation varies according to different trip constraints;
generate, based on the trip constraints, multiple driver agent models based on telemetry data and the vehicle information:
a first trip option having a first predicted travel time;
a first predicted fuel consumption; and
a first predicted velocity profile; and
a second trip option having a second predicted travel time;
a second predicted fuel consumption; and
a second predicted velocity profile; and
communicate the first trip option and the second trip option to user interface circuitry; and
wherein the user interface circuitry is operable to:
receive the first trip option and the second trip option;
present the first trip option and the second trip option to a user;
receive input from the user indicating a selected trip option from among
the first trip option and the second trip option; and
while a trip of the selected option is in progress, provide feedback to the user with driving instructions based on the selected trip option, the driving instructions comprise braking instructions and acceleration instructions to achieve a predicted fuel consumption and a predicted arrival time for the selected trip option
wherein:
the fuel consumption prediction circuitry is operable to run multiple simulations of the trip based on the vehicle information, the trip constraints, and the multiple driver agent models; and
the first predicted travel time and the first predicted fuel consumption are outputs of a first of the multiple simulations; and
the second predicted travel time and the second predicted fuel consumption are outputs of a second of the multiple simulations.

2. The system of claim 1, wherein:
the fuel consumption prediction circuitry is operable to run a simulation of the trip based on the vehicle information and the trip constraints; and
the first predicted travel time, the first predicted fuel consumption, the second predicted travel time, and the second predicted fuel consumption are outputs of the simulation.

3. The system of claim 1, wherein:
the fuel consumption prediction circuitry is operable to:
generate a velocity limit profile based on one or more of the trip constraints; and
run a simulation of the trip based on the vehicle information and the velocity limit profile; and
the first predicted travel time, the first predicted fuel consumption, the second predicted travel time, and the second predicted fuel consumption are outputs of the simulation.

4. The system of claim 3, wherein the velocity limit profile indicates a vehicle velocity for each of a plurality of points along a route of the trip.

5. The system of claim 1, wherein each of the multiple driver agent models comprises one or more of: driver agent throttle behavior, driver agent braking behavior, and driver agent velocity behavior.

6. The system of claim 1, wherein:
the first predicted travel time and first predicted fuel consumption correspond to a first of the multiple driver agent models having a first throttle behavior; and
the second predicted travel time and second predicted fuel consumption correspond to a second of the multiple driver agent models having a second throttle behavior.

7. The system of claim 1, wherein:
the first predicted travel time and first predicted fuel consumption correspond to a first of the multiple driver agent models having a first braking behavior; and
the second predicted travel time and the second predicted fuel consumption correspond to a second of the multiple driver agent models having a second braking behavior.

8. The system of claim 1, wherein:
the first predicted travel time and first predicted fuel consumption correspond to a first of the multiple driver agent models having a first velocity behavior; and
the second predicted travel time and the second predicted fuel consumption correspond to a second of the multiple driver agent models having a second velocity behavior.

9. The system of claim 1, wherein the vehicle information comprises one or more of: a throttle demand map, a maximum torque map, and a brake specific fuel consumption map.

10. The system of claim 1, wherein the trip constraints comprise legal velocity limits for one or more sections of road to be traveled during the trip.

11. The system of claim 1, wherein the trip constraints comprise physical characteristics of one or more sections of road to be traveled during the trip.

12. The system of claim 11, wherein the physical characteristics include one or more of: road grade, road curvature, and road composition.

13. The system of claim 1, wherein the trip constraints comprise transient conditions expected during the trip.

14. The system of claim 13, wherein the transient conditions include one or both of: traffic conditions and weather conditions.

15. The system of claim 1, wherein the trip constraints comprise safety constraints.

16. The system of claim 15, wherein the safety constraints include one or both of: safe braking acceleration and safe lateral acceleration.

* * * * *